United States Patent [19]
Bucher et al.

[11] Patent Number: 6,134,101
[45] Date of Patent: Oct. 17, 2000

[54] GAS-INSULATED, METAL-ENCLOSED SWITCHGEAR ASSEMBLY

[75] Inventors: Daniel Bucher, Wetzikon; Lorenz Müller, Gebenstorf, both of Switzerland

[73] Assignee: Asea Brown Boveri AG, Baden, Switzerland

[21] Appl. No.: 09/240,664

[22] Filed: Feb. 2, 1999

[30] Foreign Application Priority Data

Feb. 6, 1998 [DE] Germany ............... 198 05 705

[51] Int. Cl.⁷ .................. H02B 13/02; H02B 1/20; H02B 61/00; H02B 5/06; H02B 1/26
[52] U.S. Cl. .............. 361/612; 361/604; 361/605; 361/622; 361/624; 361/631; 361/634
[58] Field of Search .................. 361/605, 600, 361/38–40, 117, 602–609, 611–621, 622, 624, 631–634

[56] References Cited

U.S. PATENT DOCUMENTS

| | | | |
|---|---|---|---|
| 4,862,319 | 8/1989 | Suzuyama et al. | 361/341 |
| 4,933,802 | 6/1990 | Haginoya et al. | 361/48 |
| 4,967,307 | 10/1990 | Itou et al. | 361/335 |
| 5,373,415 | 12/1994 | Tawaratani | 361/612 |
| 5,578,805 | 11/1996 | Berger et al. | 218/43 |
| 5,581,439 | 12/1996 | Hachida et al. | 361/612 |
| 5,590,018 | 12/1996 | Watahiki et al. | 361/612 |
| 5,754,382 | 5/1998 | Aoyama et al. | 361/62 |
| 5,757,614 | 5/1998 | Hachida et al. | 361/602 |

FOREIGN PATENT DOCUMENTS

| | | | |
|---|---|---|---|
| 3535938A1 | 4/1987 | Germany . | |
| 401174205 | 7/1989 | Japan | H02B 13/06 |
| 407107630 | 4/1995 | Japan | H02B 13/02 |
| 408065833 | 3/1996 | Japan | H02B 13/02 |
| 408098344 | 4/1996 | Japan | H02B 13/02 |
| 408265924 | 10/1996 | Japan | H02B 13/02 |
| 408265926 | 10/1996 | Japan | H02B 13/02 |
| 410257620 | 9/1998 | Japan | H02B 13/02 |
| 410257624 | 9/1998 | Japan | H02B 13/02 |

OTHER PUBLICATIONS

"Bau und Inbetriebnahme von SF6–Schaltanlagen fur 420 kV und 525 kV Nennspannung", Szente–Varga, Brown Boveri Mitt, Nov. 1979, pp. 700–709.

Primary Examiner—Leo P. Picard
Assistant Examiner—Anatoly Vortman
Attorney, Agent, or Firm—Burns, Doane, Swecker & Mathis, L.L.P.

[57] ABSTRACT

The gas-insulated, metal-enclosed switchgear assembly contains two, three or more switchpanels, each having a multipole power breaker ($CB_1$, $CB_2$, $CB_3$, $CB_4$) as well as isolating and grounding switches per switch pole ($CB_{1R}$) and is designed like a ring or in a 1½ power-breaker circuit. The switch poles of the power breakers are each of identical design and are arranged parallel to one another. The switchpanels each have one current path of U-shaped design per phase in a vertical plane, in which current path the base of the U contains a vertically aligned pole of the power breaker, and the two limbs of the U each contain an electrical connection of the power breaker and an isolating as well as a grounding switch. The upper limbs of the U of one of the switchpanels are connected phase-by-phase to the lower limbs ($S_u$) of another of the switchpanels, by means of respective single-phase gas pipelines ($L_{12}(R)$, $L_{23}(R)$, $L_{34}(Y)$) which are arranged inclined to the vertical and are designed in straight lines. Such a switchgear assembly is distinguished by compact construction.

13 Claims, 10 Drawing Sheets

FIG. 14

GAS-INSULATED, METAL-ENCLOSED SWITCHGEAR ASSEMBLY

BACKGROUND OF THE INVENTION

FIELD OF THE INVENTION

The invention is based on a gas-insulated, metal-enclosed switchgear assembly as claimed in the preambles of patent claims 1 and 5.

DISCUSSION OF BACKGROUND

Switchgear assemblies of the abovementioned type have been described, for example, in Brown Boveri Report 11–79, pages 700 to 709. In the case of one of these switchgear assemblies, power breakers, isolating and grounding switches, current transformers as well as outgoers are installed in the switchgear assembly in the longitudinal direction of a ring busbar. Such a switchgear assembly is distinguished by good accessibility and clarity, but requires a relatively large amount of space. A corresponding statement applies to a gas-insulated, metal-enclosed switchgear assembly in a 1⅓ power-breaker circuit, described in the abovementioned publication. In the case of this switchgear assembly, four power breakers as well as isolating and grounding switches, current transformers and three outgoers are arranged between two busbars. However, there is a considerable distance between the two busbars, so that this switchgear assembly requires a relatively large amount of space.

SUMMARY OF THE INVENTION

Accordingly, one object of the invention as it is specified in the patent claims is to provide novel gas-insulated, metal-enclosed switchgear assemblies of the type mentioned initially, which are of extremely compact design and can at the same time be produced in a particularly cost-effective manner.

The switchgear assemblies according to the invention are distinguished by a small space requirement. Suitable design, arrangement and connection of the switchpanels obviate the need for the bridge panels between the individual switchpanels, which are used in the prior art and serve to accommodate the outgoers. At the same time, the switch poles of the power breakers and the majority of the connections, which are designed as single-phase gas pipelines, are of identical design, as a result of which the production costs of the switchgear assembly components can be reduced and the assembly costs of the switchgear assemblies can be decreased. Furthermore, these switchgear assemblies can be upgraded costeffectively and without any major additional cost. Any current and/or voltage converters of a conventional type which may be used in the switchgear assembly can be replaced without any problems by compact sensors which occupy little space, for example uniform-field coils or optical, preferably fiber-optical, components and, in this way, the physical width of the switchgear assemblies and of enclosures which accommodate the switchgear assemblies is considerably reduced in an advantageous manner.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DESCRIPTION OF THE PREFERRED EMBODIMENTS

Figure 1:
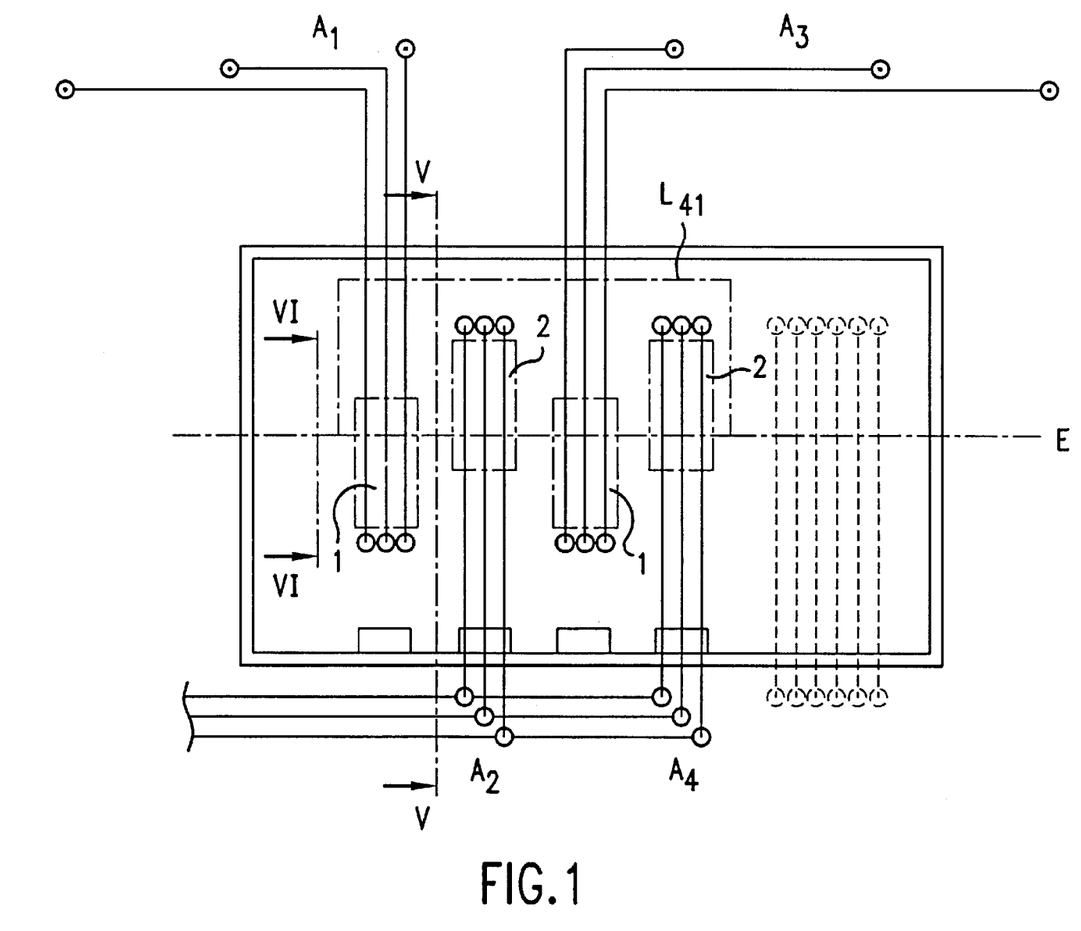
FIG. 1 shows a plan view of a layout of a first embodiment of a gas-insulated, metal-enclosed switchgear assembly according to the invention, having four switchpanels connected as a ring.

Referring now to the drawings, wherein like reference numerals designate identical or corresponding parts throughout the several views, the switchgear assembly which is illustrated as a layout in FIG. 1 has four switchpanels 1, 2, 3 and 4 which are arranged alongside one another, are of identical design and are respectively connected to an outgoer $A_1$, $A_2$, $A_3$ and $A_4$. The switchpanels 2 and 4 are arranged as mirror images of the switchpanels 1 and 3 on a plane E. The switchpanels 1 and 2 as well as 2 and 3 and as well as 3 and 4 are each connected to one another by cables which are routed in the plane E but are not shown. The switchpanels 4 and 1 are connected to one another by means of an electrical connection $L_{41}$, which interconnects the switchpanels to form a ring.

FIGS. 2 to 6 show how the switchgear assembly is designed in terms of hardware. Each switchpanel 1, 2, 3, 4 contains a power breaker $CB_1$, $CB_2$, $CB_3$, and $CB_4$ having switch poles $CB_{iR}$, $CB_{iY}$, and $CB_{iB}$, where i=1, 2, 3 and 4. For reasons of clarity, only the poles of the power breaker $CB_1$ are shown. Each switch pole, for example $CB_{1R}$, is electrically conductively connected to at least one current transformer CT, to at least one isolating switch DS and to at least one grounding switch ES. Furthermore, at least one voltage transformer VT is provided per switchpanel, which may also be omitted, depending on the operational requirements.

Figure 3:
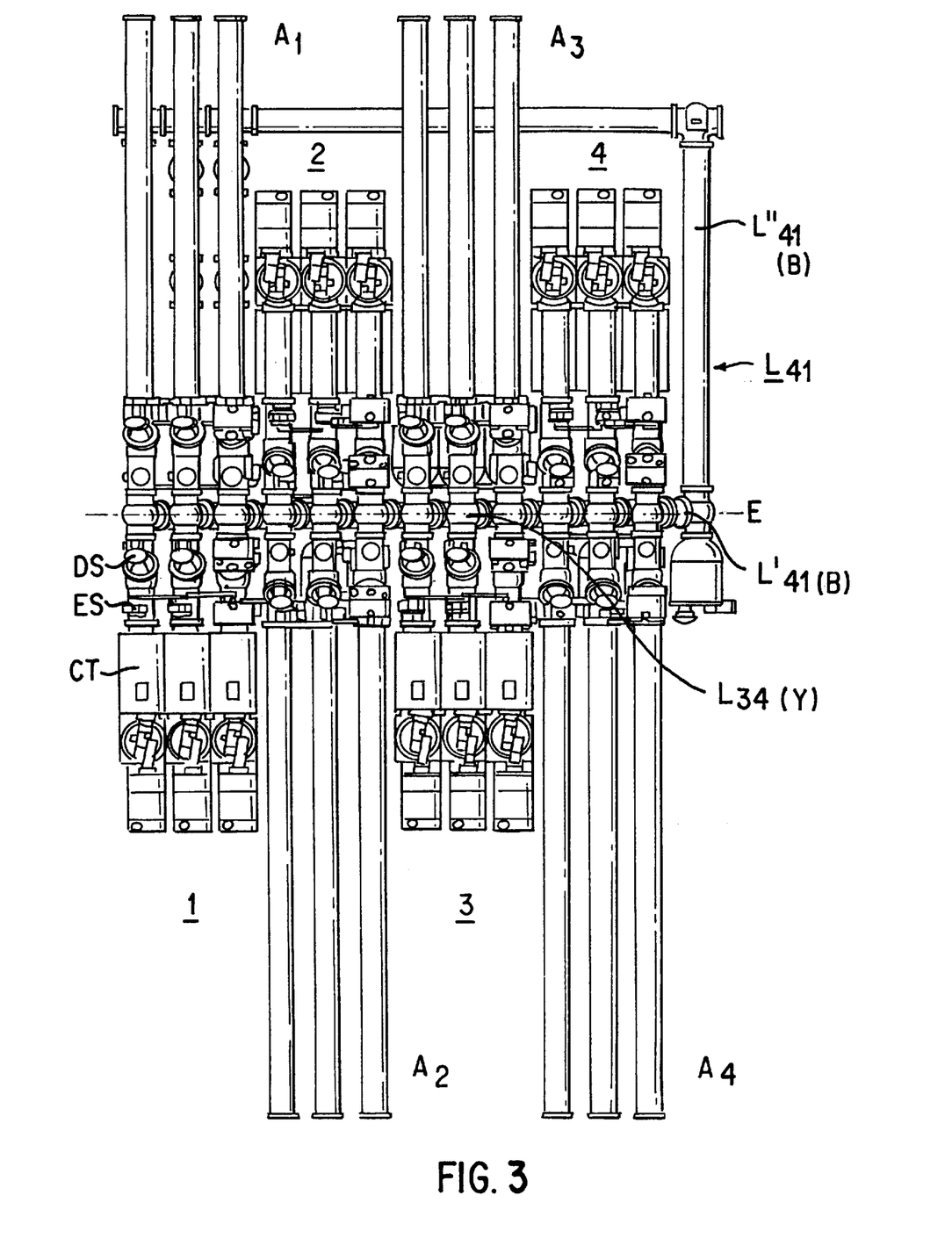
FIG. 3 shows a plan view of the switchgear assembly according to FIG. 2.
Figure 4:
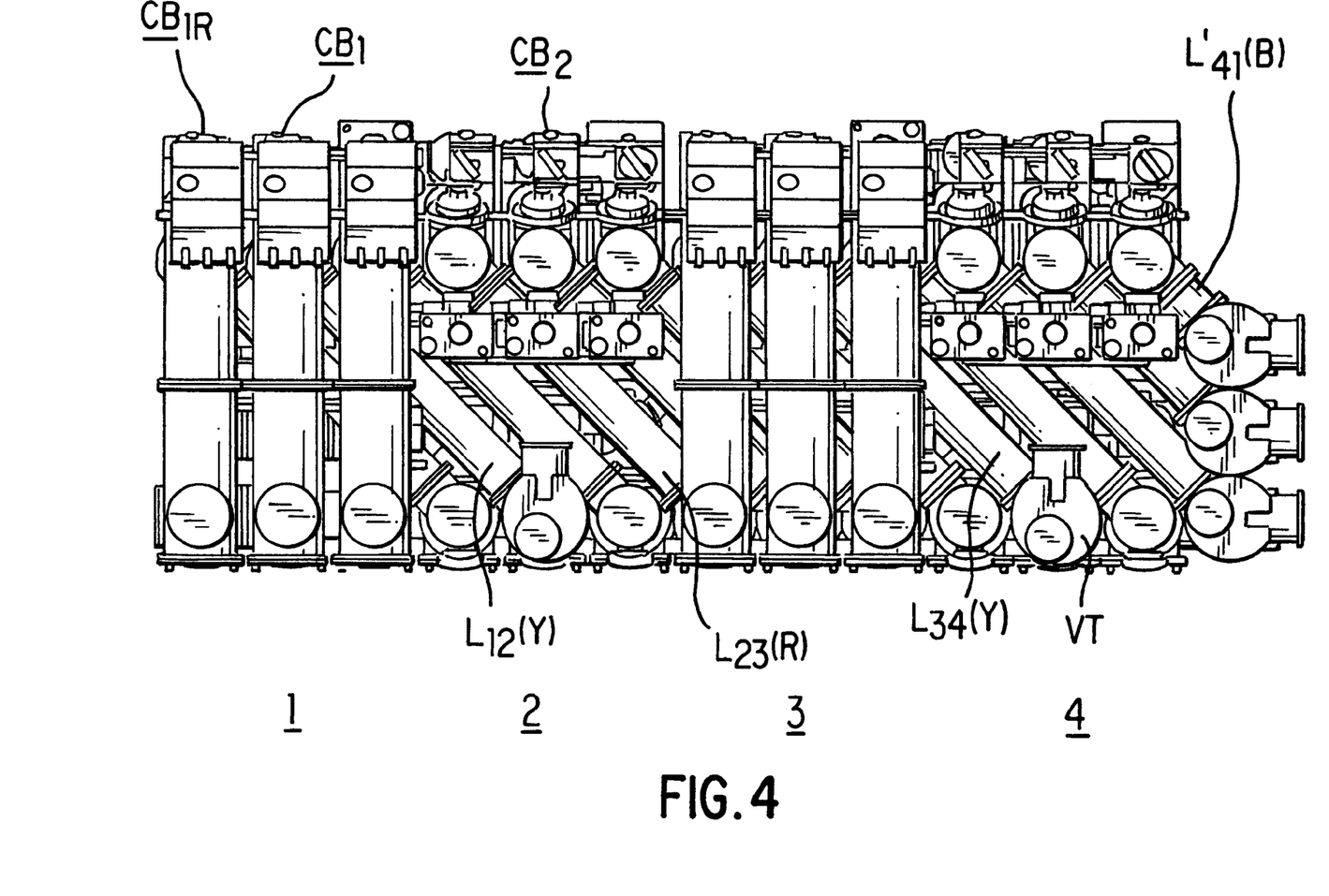
FIG. 4 shows a front view of the switchgear assembly according to FIG. 2.

FIG. 3 shows the plane E. As can be seen, the switchpanels 2 and 4 are arranged as mirror images of the switchpanels 1 and 3 on this plane. The switchgear assembly can now be connected without any problems to the outgoers $A_2$ and $A_4$ which are routed parallel to but in opposite directions to the outgoers $A_1$ and $A_3$. Electrical connections which are each designed as a single-phase gas pipeline $L_{ij}(K)$, where i,j=1, 2, 3, 4 and K=R, Y, B, are shown in the plane E between the switchpanels 1 and 2, 2 and 3, 3 and 4 as well as 4 and 1. For reasons of clarity, only some of the electrical connections are shown, for example the electrical connections $L_{34}(Y)$ of the Y phase between the switchpanels 3 and 4 and the electrical connections $L_{41}(B)$ of the B phase between the switchpanels 4 and 1. The majority of the electrical connections $L_{ij}(K)$ are arranged in the plane E and are each produced by means of a section of a single-phase gas pipeline which is arranged inclined to the vertical and designed in a straight line. These electrical connections are aligned parallel to one another. The three electrical connections $L_{41}(K)$, K=R, Y, B each have an inclined section which is routed in the plane E, for example $L_{41}(B)'$, (FIG. 4) as well as a section, for example $L_{41}(B)''$ which is routed predominantly horizontally and is bent at right angles a number of times (FIG. 3), which is connected to the section $L_{41}(B)'$ and produces the electrical connection for the B phase of the switchpanel 1. The sections $L_{41}(K)''$ of the individual phases of the electrical connection $L_{41}$ are arranged vertically one above the other. The sections $L_{41}(K)'$ associated with the R, Y and B phases are of different lengths and, at least in the case of the Y and B phases, are shorter than the other electrical connections $L_{ij}(K)$ (FIG. 4).

The switch poles of the power breakers are essentially all of identical design and are arranged in planes that extend parallel to one another. The switch poles $CB_{2R}$ and $CB_{1R}$ can be seen in FIGS. 5 and 6, and represent all the other switch poles. Each switch pole is a component of one of the switchpanels. As can be seen, the switchpanels each have one current path of U-shaped design per phase, arranged in a vertical plane. The base B of the U is located in the vertically aligned switch pole $CB_{2R}$ (FIG. 5) and, respectively, $CB_{1R}$ (FIG. 6) of the power breaker $CB_2$ and $CB_1$, respectively, while, in contrast, the two limbs $S_o$ and $S_u$ of the U each contain an electrical connection of the power breaker, an isolating switch DS and a grounding switch ES. In the case of the switch pole $CB_{2R}$, a current transformer CT is also arranged in the lower limb $S_u$ of the U while, in contrast, in the case of the mirror-image switch pole $CB_{1R}$, a current transformer CT is arranged in the upper limb $S_o$. It is also possible to see from the figures that one of the electrical connections $L_{ij}(K)$ is attached to each of the limbs $S_o$ and $S_u$ in the plane E.

Figure 5:
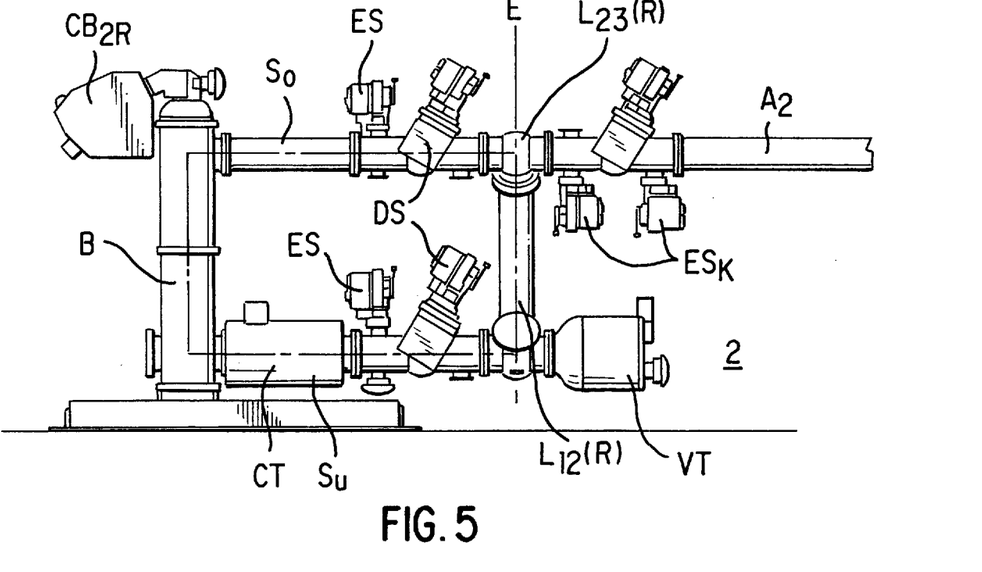
FIG. 5 shows a section along V—V (FIG. 1) through the switchgear assembly according to FIGS. 2 to 4.

In FIG. 5, these are the electrical connections $L_{23}(R)$ from the upper limb $S_o$ of the current path which contains the switch pole $CB_{2R}$ to the lower limb $S_u$ of the current path which contains the switch pole $CB_{3R}$, as well as from the lower limb $S_u$ of the current path which contains the switch pole $CB_{2R}$ to the upper limb $S_o$ of the current path which contains the switch pole $CB_{1R}$.

Figure 6:
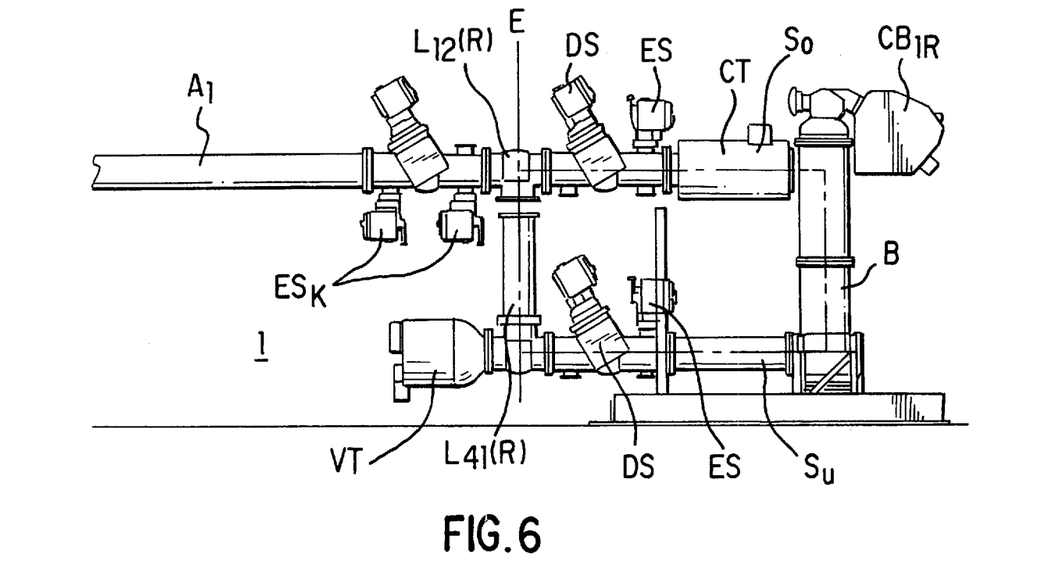
FIG. 6 shows a section along VI—VI (FIG. 1) through the switchgear assembly according to FIGS. 2 to 4.

In FIG. 6, these are the abovementioned electrical connection $L_{12}(R)$ from the upper limb $S_o$ of the current path which contains the switch pole $CB_{1R}$ to the lower limb $S_u$ of the current path which contains the switch pole $CB_{2R}$ as well as the electrical connections $L_{41}(R)$ from the switchpanel 4 to the lower limb $S_u$ of the current path which contains the switch pole $CB_{1R}$.

The gas pipelines $L_{ij}(K)$ which are arranged inclined in general have an inclination of about 45°. This reliably produces an extremely compact switchgear assembly. Switchgear assemblies which still have a very space-saving design can also be achieved with an inclination angle of about 30° to 60° to the vertical. In the case of these switchgear assemblies, the upper limbs $S_o$ of the U continue in an outgoer, for example $A_2$ (FIG. 5) of one of the switchpanels, for example 2. A node grounding switch $ES_k$ which is conductively connected to the conductor of the gas pipeline section, for example of the electrical connections $L_{23}(R)'$ is arranged in a space-saving manner in this outgoer.

Figure 2:
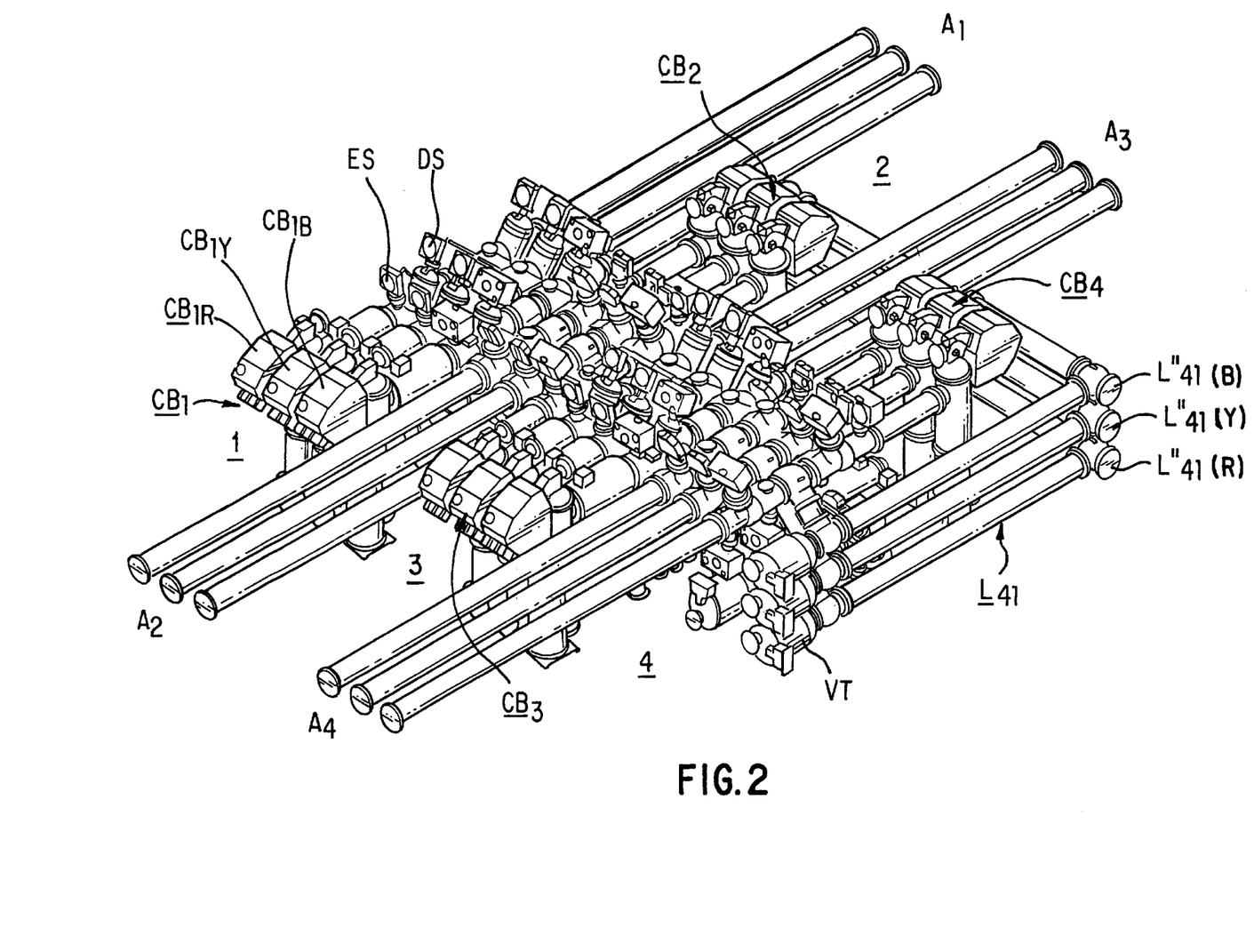
FIG. 2 shows a perspective view of a first embodiment of the hardware design of the switchgear assembly according to FIG. 1.
Figure 7:
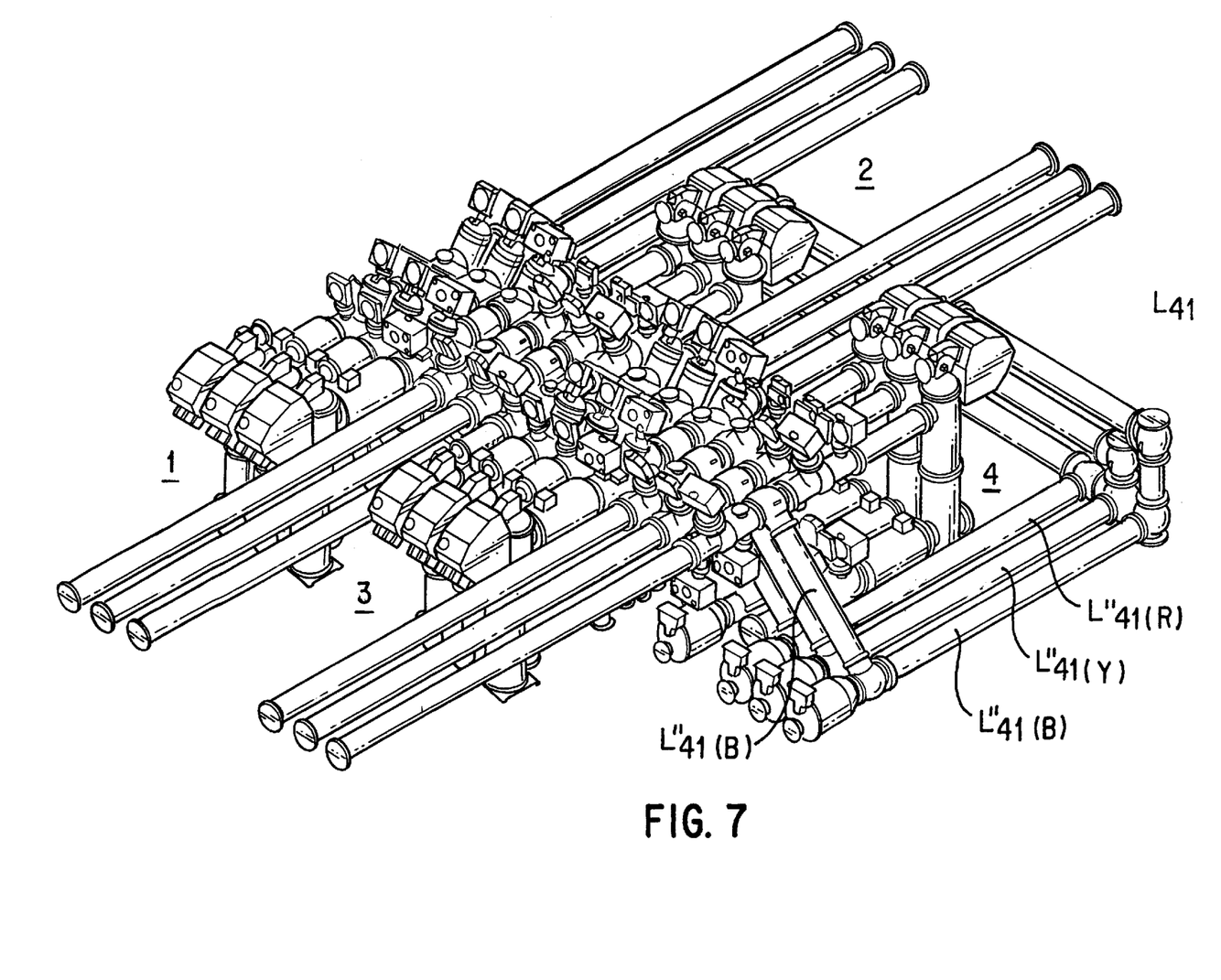
FIG. 7 shows a perspective view of a second embodiment of the hardware design of the switchgear assembly according to FIG. 1.
Figure 8:
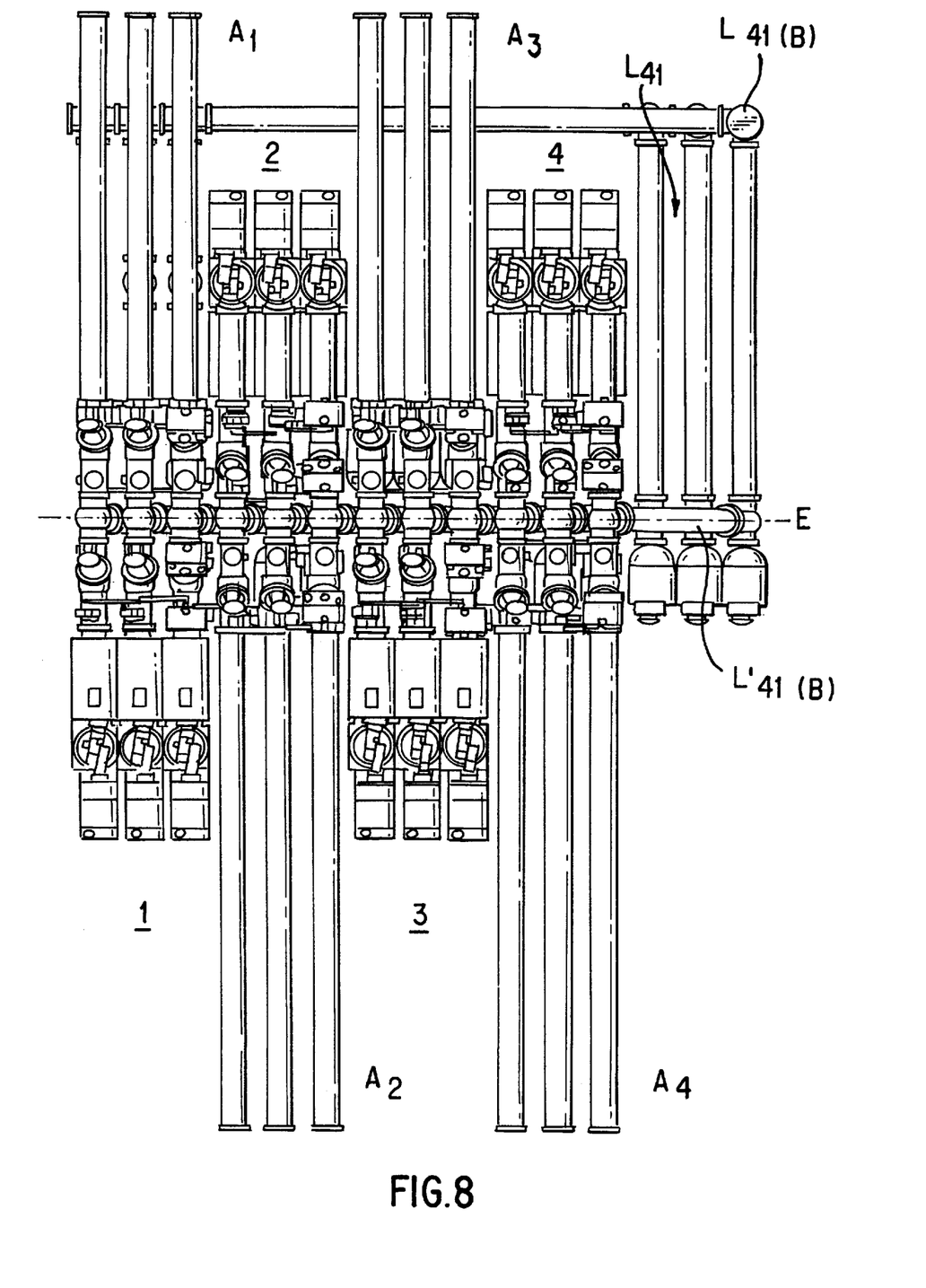
FIG. 8 shows a plan view of the switchgear assembly according to FIG. 7.

In contrast to the embodiment of the switchgear assembly according to FIGS. 2 to 4, in the case of the switchgear assembly according to FIGS. 7 and 8 the three sections $L_{41}'(R)$, $L_{41}'(Y)$, $L_{41}'(B)$ which are arranged inclined are of the same length. As can be seen, the horizontally routed sections $L_{41}''(R)$, $L_{41}''(Y)$, $L_{41}''(B)$ of the individual phases are then arranged horizontally alongside one another, at least in sections. Since all the sections which are arranged inclined are of the same length, this switchgear assembly is particularly advantageous from the production point of view.

Figure 9:
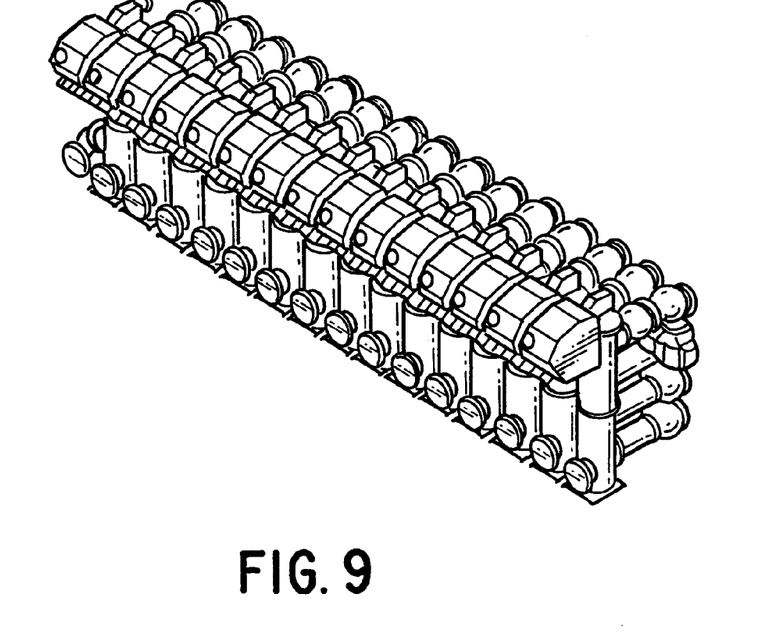
FIG. 9 shows a perspective view of a third embodiment of a gas-insulated, metal-enclosed switchgear assembly according to the invention having four switchpanels connected as a ring.
Figure 10:
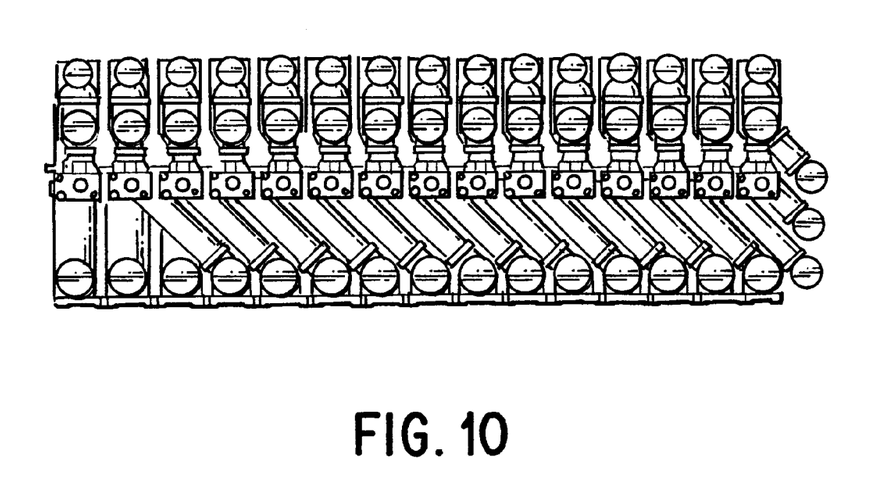
FIG. 10 shows a rear view of the switchgear assembly according to FIG. 9.
Figure 11:
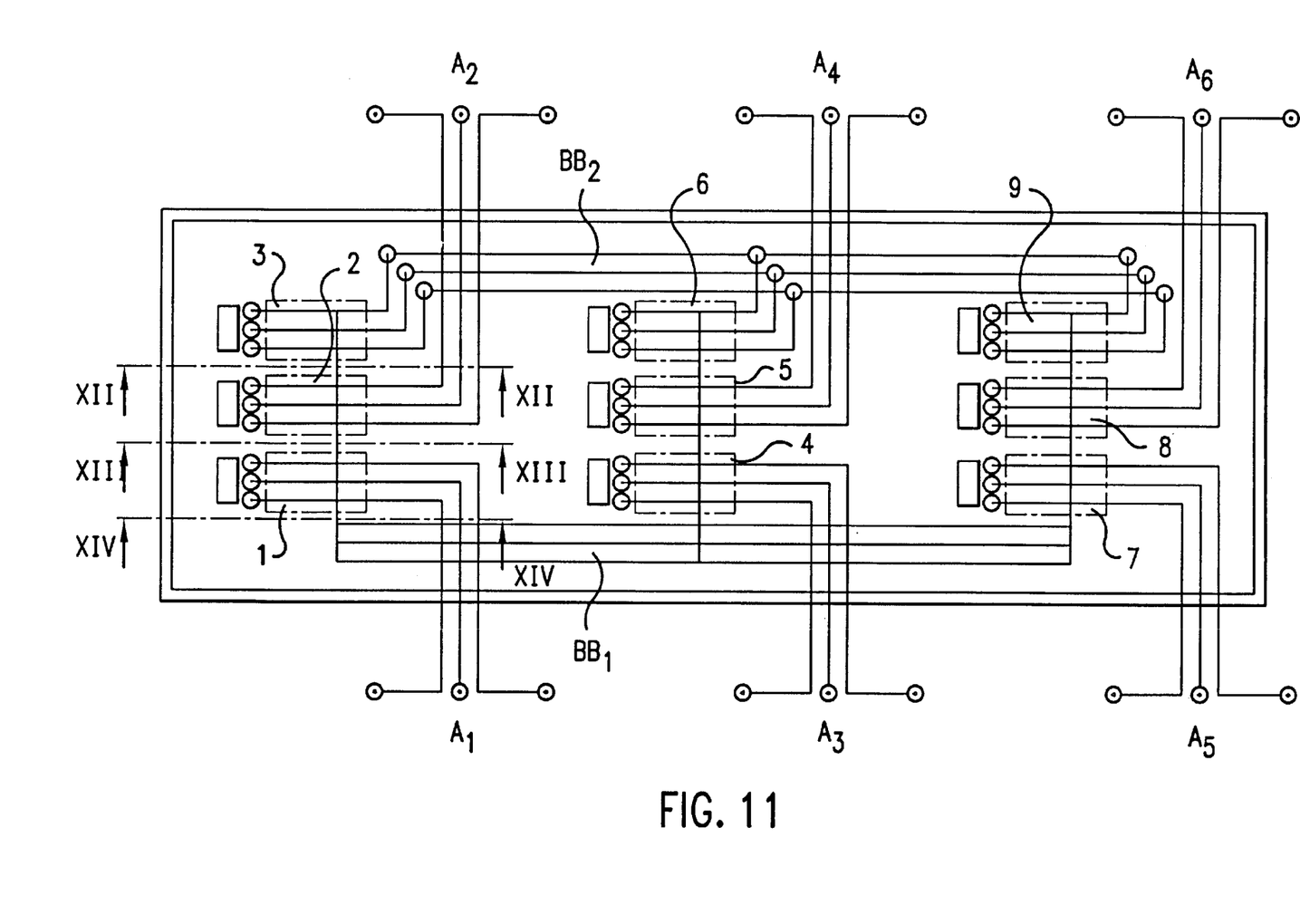
FIG. 11 shows a plan view of a layout of a fourth embodiment of a gas-insulated, metal-enclosed switchgear assembly according to the invention, which is designed with a 1½ power-breaker circuit.

If the outgoers are routed away from the switchgear assembly in only one direction, then the switchpanels can be aligned in the same way. Such a switchgear assembly is illustrated in FIGS. 9 and 10. Only the power breakers can now be seen on the front of such a switchgear assembly, and the electrical connections $L_{ij}(K)$ on the rear side.

In the embodiment of the switchgear assembly according to FIGS. 11 to 14, in each case three groups of in each case three switchpanels 1 to 9 positioned in a row are connected between two busbars $BB_1$ and $BB_2$. Corresponding to the two embodiments of the switchgear assembly according to the invention that have already been described, each switchpanel contains a multipole power breaker as well as an isolating switch and grounding switch per switch pole. In each case three switchpanels or power breakers are assigned two of six outgoers $A_1$, to $A_6$, for example the panels 1 to 3 are assigned the outgoers $A_1$ and $A_2$. The switchgear assembly is thus designed as a 1½ power-breaker circuit. Even with this switchgear assembly, a considerable amount of space is saved since the three groups of switchpanels 1 to 3, 4 to 6 and 7 to 9 are each of extremely compact design. This compact design is achieved, as in the case of the switchgear assembly connected as a ring, by the following measures: The switch poles $CB_{iK}$, where i=1, 2, 3, . . . , 9 and K=R, Y, B, the power breaker $Cb_i$, are each of identical design and are arranged parallel to one another. The switchpanels 1 to 9 are arranged in a vertical plane per phase and each have a current path designed in a U-shape, in which the base B of the U contains a vertically aligned pole $CB_{iK}$ of the power breaker, and the two limbs $S_o$ and $S_u$ of the U each contain an electrical connection of the switch pole and an isolating switch DS as well as a grounding switch ES. The upper limbs $S_o$ of the U of one of the three switchpanels, for example 2, are connected phase-by-phase to the lower limbs $S_u$ of the U of another of the three switchpanels, for example 3, in each case by means of a section $L_{ij}(R)$ of a single-phase gas pipeline which is arranged inclined to the vertical and is designed in a straight line.

Figure 12:
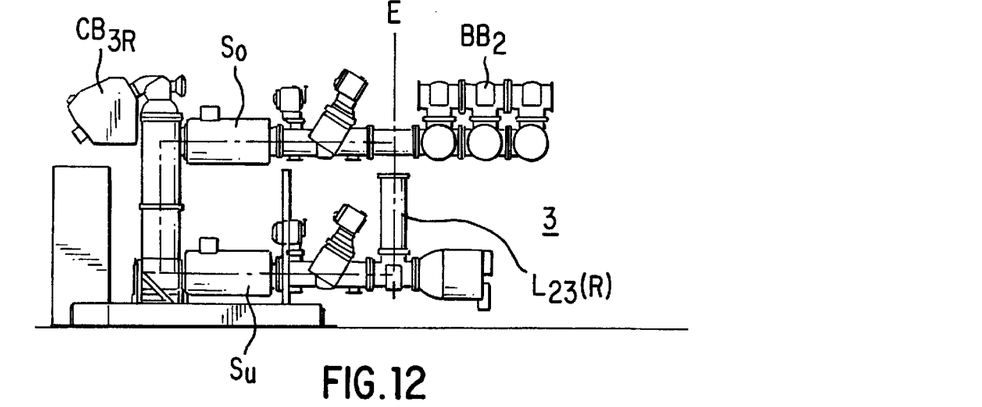
FIG. 12 shows a section along XII—XII through the switchgear assembly according to FIG. 11.
Figure 13:
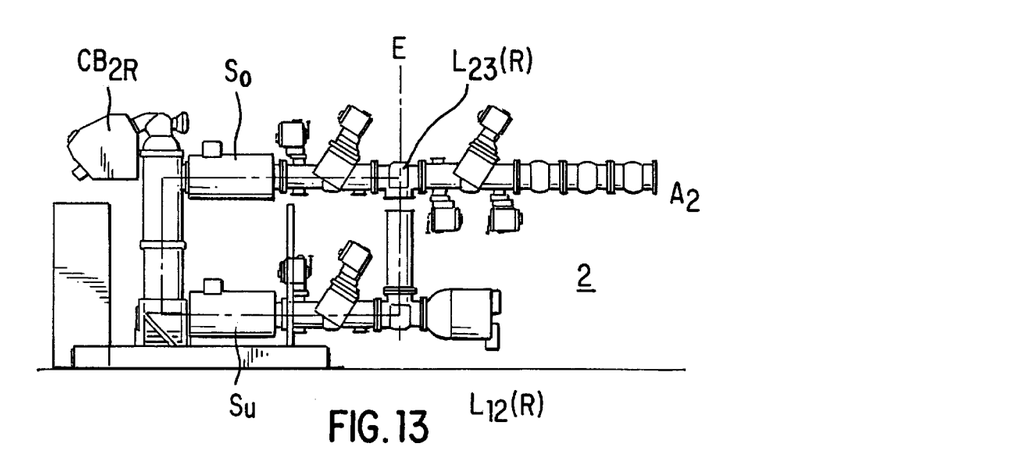
FIG. 13 shows a section along XIII—XIII through the switchgear assembly according to FIG. 11.
Figure 14:
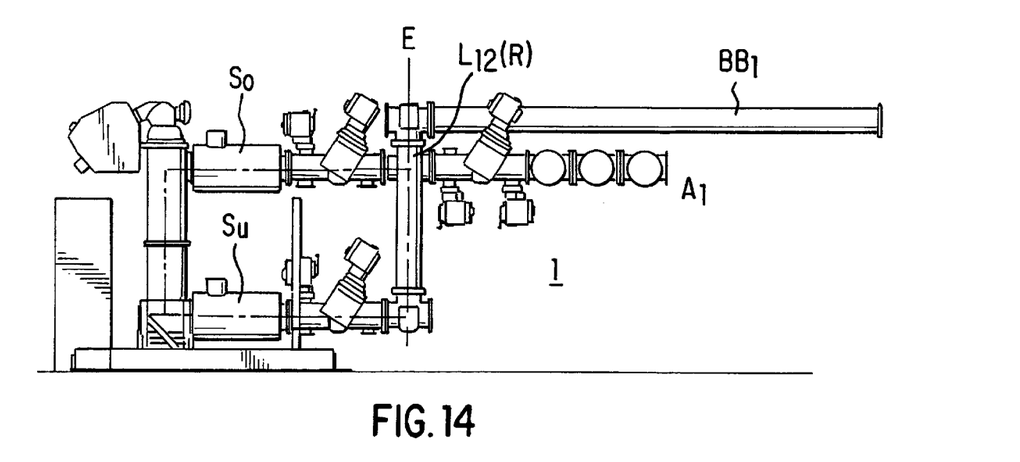
FIG. 14 shows a section along XIV—XIV through the switchgear assembly according to FIG. 11.

Such electrical connections which are arranged inclined are the gas pipeline $L_{23}(R)$ indicated in FIGS. 12 to 14, which connects the upper limb $S_o$ of the current path which contains the switch pole $CB_{2R}$ to the lower limb $S_u$ of the current path which contains the switch pole $CB_{3R}$, and $L_{12}(R)$, which connects the lower limb $S_u$ of the current path which contains the switch pole $CB_{2R}$ to the upper limb $S_o$ of the current path which contains the switch pole $CB_{1R}$.

The upper limbs of the U of the switchpanel 3 (FIG. 12) are each connected to one phase of the busbar $BB_2$ and the lower limbs of the U of the switchpanel 1 (FIG. 14) are each connected to one phase of the busbar $BB_1$.

Obviously, numerous modifications and variations of the present invention are possible in light of the above teachings. It is therefore to be understood that, within the scope of the appended claims, the invention may be practiced otherwise than as specifically described herein.

LIST OF DESIGNATIONS

| | |
|---|---|
| 1, 2, ..., 9 | Switchpanels |
| $A_1, A_2, \ldots, A_6$ | Outgoers |
| E | Plane |
| $Cb_i$, i = 1, 2, ..., 9 | Power breakers |
| $CB_{iK}$, i = 1, 2, ..., 9 | |
| K = R, Y, B | Switch poles |
| DS | |
| ES | Isolating switch |
| ES | Grounding switch |
| $ES_k$ | Node grounding switch |
| CT | Current transformer |
| VT | Voltage transformer |
| $BB_1, BB_2$ | Busbars |
| $L_{ij}$, i, j = 1, 2, ..., 4 | Electrical connections |
| $L_{ij}(K)'$, $L_{ij}(K)''$, | |
| i, j = 1, 2, 3, 4; K = R, Y, B | Sections of |
| B | Base of a U |
| $S_o, S_u$ | Limbs of the U |

What is claimed as new and desired to be secured by Letters Patent of the United States is:

1. A gas-insulated, metal-enclosed switchgear assembly having at least two switchpanels which each contain a plurality of power breakers as well as isolating and grounding switches per switch pole and are interconnected like a ring, wherein the switch poles of the power breakers are each of identical design and are arranged parallel to one another, wherein the switchpanels each have one current path of U-shaped design per phase in a vertical plane, in which current path the base of the U contains a vertically aligned pole of the power breaker and the two limbs each contain an electrical connection of the power breaker and an isolating switch as well as a grounding switch, and wherein the upper limbs of the U of a first of the two switchpanels are connected phase-by-phase to the lower limbs of the second of the two switchpanels, by means of respective single-phase gas pipelines which are arranged inclined to the vertical and are designed in straight lines.

2. The switchgear assembly as claimed in claim 1, wherein the second or at least one further switchpanel is connected to the first switchpanel via one of the gas pipelines which, in addition to a gas pipeline section arranged inclined, has a predominantly horizontally routed section per phase.

3. The switchgear assembly as claimed in claim 2, wherein the horizontally routed sections of the individual phases are arranged vertically one above the other, and wherein the sections which are arranged inclined are of different length.

4. The switchgear assembly as claimed in claim 2, wherein the horizontally routed sections of the individual phases are arranged horizontally alongside one another at least in sections, and wherein the sections which are arranged inclined are of the same length.

5. A gas-insulated, metal-enclosed switchgear assembly having at least three switchpanels which each contain a multipole power breaker as well as isolating and grounding switches per switch pole and are connected between two busbars, wherein the switch poles of the power breakers are each of identical design and are arranged parallel to one another, wherein the switchpanels each have one current path of U-shaped design per phase in a vertical plane, in which current path the base of the U contains a vertically aligned pole of the power breaker and the two limbs each contain an electrical connection of the power breaker and an isolating switch as well as a grounding switch, and wherein the upper limbs of the U of a first of the three switchpanels are connected phase-by-phase to the lower limbs of the U of a second of the three switchpanels, by means of respective single-phase gas pipelines which are arranged inclined to the vertical and are designed in straight lines.

6. The switchgear assembly as claimed in claim 5, wherein the lower limbs of the U of the first switchpanel are connected phase-by-phase to the upper limbs of the U of a third of the three switchpanels, in each case by means of a section of a gas pipeline which is arranged inclined to the vertical and is designed in a straight line.

7. The switchgear assembly as claimed in claim 6, wherein the upper limbs of the U of the second switchpanel are each connected to one phase of a first of the two busbars, and the lower limbs of the U of the third switchpanel are each connected to one phase of a second of the two busbars.

8. The switchgear assembly as claimed in claim 1, wherein the gas pipelines which are arranged inclined lie in a plane which is at right angles to the limbs of the U.

9. The switchgear assembly as claimed in claim 8, wherein the inclination is about 30° to 60°, preferably about 45°.

10. The switchgear assembly as claimed in claim 1, wherein the upper limbs of the U of the first switchpanel each contain an outgoer, between which outgoer and the isolating switch the upper end of the gas pipeline section, which is arranged inclined, is arranged.

11. The switchgear assembly as claimed in claim 10, wherein a node grounding switch which is conductively connected to the conductor of the gas pipeline section is arranged in the outgoer.

12. The switchgear assembly as claimed in claim 8, wherein the first and the second switchpanels are arranged as mirror images of one another, the mirror plane being the plane which contains the inclined gas pipelines.

13. The switchgear assembly as claimed in claim 1, wherein a current transformer is arranged in the upper and/or the lower limb of the U between the electrical connection and grounding switch.

* * * * *